United States Patent [19]

Weber

[11] 4,012,893
[45] Mar. 22, 1977

[54] METHOD OF LOADING TRANSPORTING TROLLEYS WITH FULL CANS OR THE LIKE AND SUPPLYING FULL CANS TO SPINNING MACHINES FED WITH FIBER SLIVER AND APPARATUS FOR IMPLEMENTING THE METHOD

[75] Inventor: Kurt Weber, Elgg, Switzerland

[73] Assignee: Rieter Machine Works, Ltd., Winterthur, Switzerland

[22] Filed: Dec. 8, 1975

[21] Appl. No.: 638,921

[30] Foreign Application Priority Data

Dec. 24, 1974 Switzerland .................... 17269/74

[52] U.S. Cl. .............................. 57/34 R; 19/159 A; 57/156; 214/1 B; 214/16.1 R
[51] Int. Cl.² ........................................ D01H 9/00
[58] Field of Search .............. 57/34 R, 90, 52, 36, 57/54, 156, 1 R; 19/159 R, 159 A; 214/1 B, 16 R, 16.1 R, 16.1 B, 16.1 BA, 84

[56] References Cited

UNITED STATES PATENTS

| | | | |
|---|---|---|---|
| 3,083,415 | 4/1963 | Osaki et al. .................... | 19/159 A |
| 3,125,782 | 3/1964 | Kaino et al. .................... | 19/159 A |
| 3,199,152 | 8/1965 | Tooka et al. .................... | 19/159 A |
| 3,263,281 | 8/1966 | Cole ............................ | 19/159 A X |
| 3,323,177 | 6/1967 | Binder et al. ................... | 19/159 A |
| 3,443,287 | 5/1969 | Hertzsch ........................ | 19/159 A |
| 3,773,191 | 11/1973 | Ishida .......................... | 214/16.1 R |
| 3,828,682 | 8/1974 | Klein ........................... | 57/52 X |
| 3,884,026 | 5/1975 | Yoshizawa et al. ................ | 57/34 R |

*Primary Examiner*—John Petrakes
*Attorney, Agent, or Firm*—Werner W. Kleeman

[57] ABSTRACT

A method of, and apparatus for, loading transporting trolleys with full cans and supplying full cans to spinning machines fed with fiber sliver, wherein the empty cans are placed upon transporting trolleys interconnected to form a transporting trolley train and transported from a spinning machine fed with fiber sliver to a can loading device. The cans are transported from their transporting trolley first to a can take-up station, then are engaged by a revolving can transporting device which transports each of the cans to a spinning preparatory machine delivering a fiber sliver and where each of the cans are filled with the fiber sliver. After filling the cans are transported via a can output station back onto a transporting trolley of the same train and such transporting trolley train is then brought back to the spinning machine fed with fiber sliver.

8 Claims, 2 Drawing Figures

4,012,893

METHOD OF LOADING TRANSPORTING TROLLEYS WITH FULL CANS OR THE LIKE AND SUPPLYING FULL CANS TO SPINNING MACHINES FED WITH FIBER SLIVER AND APPARATUS FOR IMPLEMENTING THE METHOD

BACKGROUND OF THE INVENTION

The present invention relates to a new and improved method of, and apparatus for, loading transporting trolleys with full cans and supplying the full cans to spinning machines fed with fiber sliver.

There are already known to the art, for instance as taught in Japanese patent application Sho 47-50020, can transporting devices wherein full cans are transported from a spinning preparatory machine, for example a drawframe, upon transporting belts to open-end spinning machines and empty cans are transported back to the spinning preparatory machine.

The installation of transporting belts or equivalent structure in new or existing buildings is associated with appreciable building complications and financial costs. Furthermore, transporting vehicles, such as fork lift trucks, cannot be operated upon such transporting belts, or at best only to a limited extent. Transporting belt structures require a great deal of costly production space.

SUMMARY OF THE INVENTION

It is a primary object of the present invention to provide an improved method of, and apparatus for, unloading empty cans from transporting trolleys, filling the same, and reloading the full cans onto such transporting trolleys, in a manner which overcomes the aforementioned drawbacks and limitations of the prior art proposals.

Still another more specific object of the present invention aims at a new and improved method of, and apparatus for, handling cans which are fed back and forth between a spinning preparatory machine and a spinning machine fed with fiber sliver, in an extremely efficient and reliable manner.

Yet a further significant object of the present invention is directed to loading cans from a spinning preparatory machine onto transporting trolleys without any complications in the construction of the building or structure housing the equipment, and to transport the full cans to a spinning machine fed with fiber sliver and to transport the empty cans back again to the spinning preparatory machine.

Another object of this invention aims at the provision of a novel can handling system, and method of operating the same, wherein the cans are transported back and forth between a spinning preparatory machine where the cans are filled and a spinning machine where the cans are emptied, unloading and loading of the cans at the station associated with the spinning preparatory machine occurring in an extremely efficacious and reliable manner, there being assured that the spinning machine is continually replenished with full cans without any interruptions in order to insure for good production output of the spinning machine.

Now in order to implement these and still further objects of the invention, which will become more readily apparent as the description proceeds, the method aspects of this development are manifested by the features that the empty cans are placed onto transporting trolleys which are coupled together to form a transporting trolley train, the thus placed cans are transported by means of the transporting trolley train from a spinning machine fed with fiber sliver to a can loading device. At the location of the can loading device the empty cans are transported from their associated transporting trolley first to a can take-up or receiving station, then are engaged by a revolving can transporting device which transports the cans to a spinning preparatory machine delivering fiber sliver. At that location the individual cans are successively filled with fiber sliver, then are transported via a can output station back onto a transporting trolley of the same transporting trolley train, and such transporting trolley train in a train configuration is brought back again to the spinning machine fed with fiber sliver.

As alluded to above, the invention is not only concerned with the aforementioned method aspects, but also relates to apparatus for the implementation of the aforesaid method, which apparatus is manifested by the features that the can loading station contains a transporting trolley-shifting device for in-feeding the interconnected can transporting trolleys. At the can loading station a group of cans placed upon one of the transporting trolleys can be moved by a first pushing or pusher device onto a can take-up station. By means of a revolving can transporting device the cans can be transported to a spinning preparatory machine, such as for instance a drawframe, which delivers fiber sliver, and then to a can output or delivery station where the cans can be moved by means of a second pushing or pusher device onto empty transporting trolleys of the same transporting trolley train.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
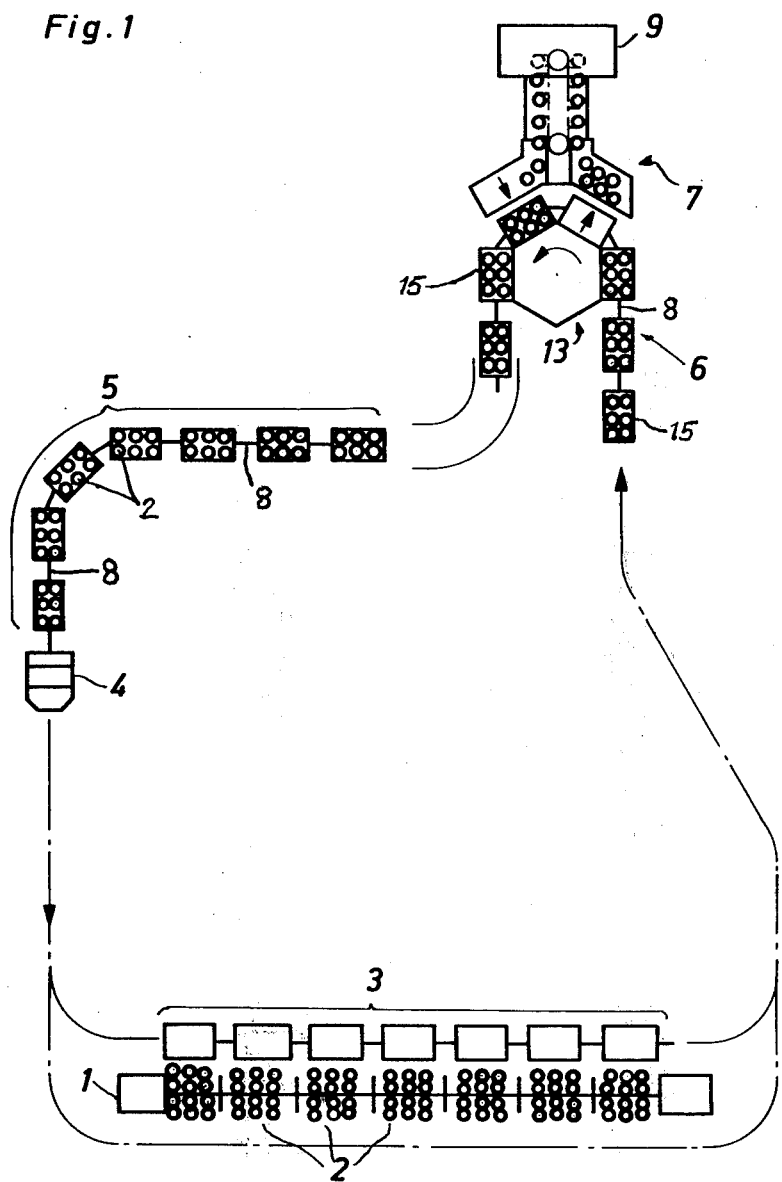
FIG. 1 schematically illustrates a system for off-loading empty cans from transporting trolleys of a transporting trolley train, filling the empty cans with fiber sliver, on-loading the filled cans at the transporting trolleys of the same transporting trolley train, and transporting the cans to a further processing machine, for instance an open-end spinning machine where the filled cans are again emptied during processing of the fiber sliver.
Figure 2:
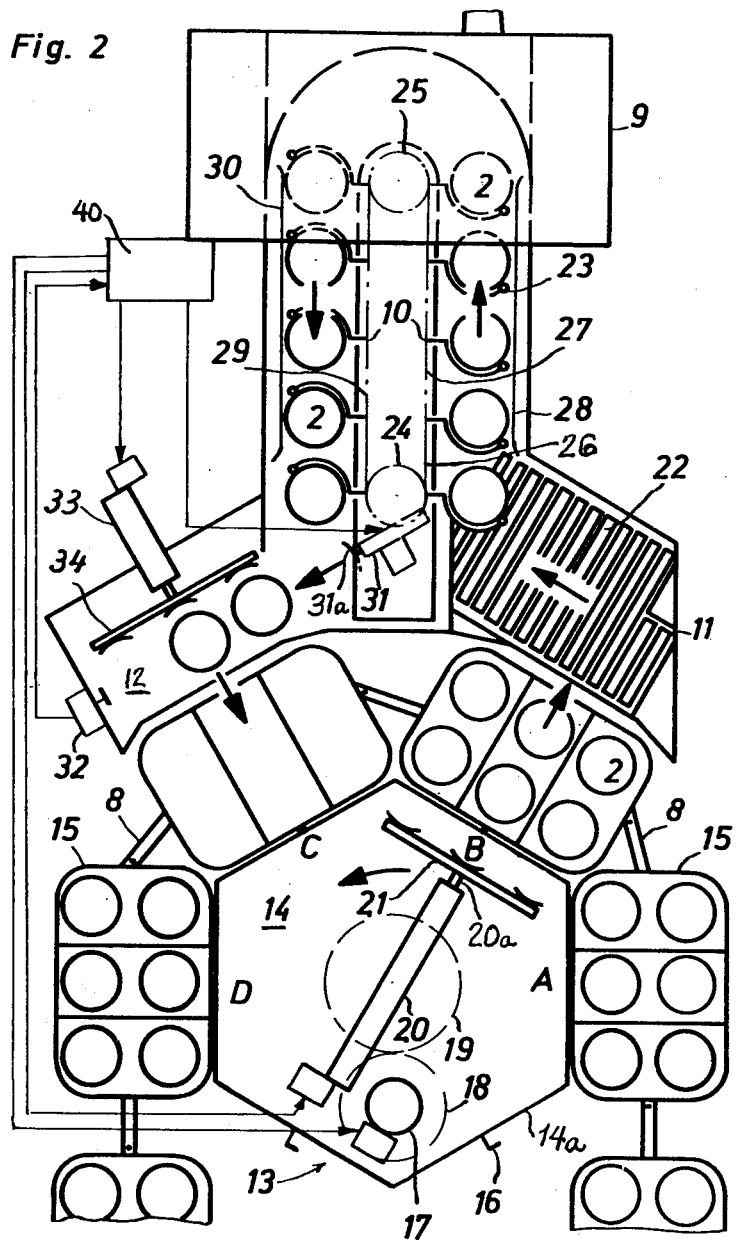
FIG. 2 illustrates details of a can loading station for off-loading and on-loading cans of transporting trolleys and used in the system of FIG. 1.

Describing now the drawings, in the system shown in FIG. 1 reference character 1 designates by way of example an open-end spinning machine constituting a spinning machine fed with fiber sliver. The spinning machine 1 need not of necessity be an open-end spinning machine but can be another textile machine which requires a supply of fibers or fibrous material in order to process the same. Now at the spinning machine 1 there are provided a number of cans or containers 2 or equivalent structure corresponding to the number of spinning positions. There will be further recognized a transporting trolley train 3 carrying full reserve cans 2 and located in front of the spinning machine 1. Hitched to a tractor 4 is a further transporting trolley train 5 upon which there are also loaded a number of filled cans 2 corresponding to the number of spinning positions of a side of the spinning machine 1. A still further transporting trolley train 6 of the same type is located at a can loading station 7, the details of which will be discussed more fully hereinafter in conjunction with FIG. 2. The transporting trolleys or wagons 15 of each of the transporting trolley trains 3, 5 and 6 are mutually connected by center poles 8 and provided with any conventional steering arrangement enabling the transporting trolley trains to follow the same path as the associated tractor 4 in a manner such that they can be maneuvered into proper position in front of the spinning machine or other textile machine. The manner in which the individual trolleys 15 are hitched together in any given train is not in any way crucial to the invention and standard techniques can be employed.

Continuing, the can loading station 7 is constructed at a spinning preparatory machine, here assumed to be constituted by a drawframe 9. At the can loading station 7 empty cans 2 are filled, these empty cans arriving by means of one of the transporting trolley trains, such as the transporting trolley train 6, from the spinning machine 1. The can loading station or can loader 7 is shown in detail in FIG. 2 and will be seen to comprise substantially the following structure: A revolving can transporting device 10, a can take-up or receiving station 11, a can output or delivery station 12, and a rotating device 13 for shifting the transporting trolleys 15 of the associated coupled together transporting trolley train. As will be apparent from the disclosure to follow, the term "revolving" as used herein is employed in its broader sense to encompass also incremental revolving or rotary movement i.e. stepped rotational movement.

The rotating device 13 is in the form of a turntable which may be constituted by a substantially hexagonal plate 14 supported for rotation about a substantially central vertical axis. The sides 14a of the hexagonal plate 14 essentially correspond in length to the length of each individual transporting trolley 15 coupled together to form the transporting trolley train, such as the train 6, which is being handled momentarily at the can loading station 7. Each such plate side 14a is provided with a pawl or latch 16 or equivalent catch device which protrudes towards the outside and which can be pivoted for the purpose of securing to the turntable plate 14 the transporting trolleys 15. Any suitable drive motor 17 can be provided for the rotating device 13, the drive motor 17 being controlled such that the plate 14 is rotated stepwise through increments of 60°. Of course, the form of the turntable plate 16 is not crucial inasmuch as other polygonal configurations can be readily employed without departing in any way from the teachings of the invention.

Mounted above the turntable plate 14 so as to be non-rotatable and extending substantially horizontally is a fluid operated e.g. pneumatic piston and cylinder unit 20, the piston rod 20a of which carries a pusher or thrust rod 21 which serves the purpose of pushing empty cans 2 from a transporting trolley 15 located in front of the pusher rod 21 or equivalent structure onto the can take-up or receiving station 11. In other words, the pneumatic piston and cylinder unit 20 with the pusher rod 21 off-loads the empty cans 2 from a transporting trolley onto the can take-up station 11 where the empty cans can be further processed i.e. conveyed towards the spinning preparatory machine 9 for refilling the same with the fiber sliver or the like. The can take-up station 11 is provided at its bottom with driven transporting or feed rolls 22 which displace the cans 2 in the direction towards the indexed revolving can transporting device 10. It will be observed from the showing of FIG. 2 that the can transporting device 10 incorporate the revolving gripper arms 23 each of which can positively grasp and entrain one of the cans 2. The gripping arms 23 are mounted upon a transport element, for instance a chain 26 which revolves about a pair of vertically supported sprocket wheels 24, 25 and protrude horizontally away from the body of such chain 26. The sprocket wheel or gear 24 is provided between the can take-up station 11 and the can output or delivery station 12 and the sprocket wheel or gear 25 is provided in the drawframe 9. While details of the can transporting device 10 will be considered herein to the extent necessary to understand fully the underlying principles and concepts of the present invention, a preferred constructional embodiment of can transporting device constitutes subject matter of my commonly assigned, copending United States application Ser. No. 638,922, filed Dec. 8, 1975, entitled "Apparatus For Supplying Spinning Preparatory Machines With Cans Or The Like", to which reference may be readily had and the disclosure of which is incorporated herein by reference.

Continuing, below the chain run 27 at the can take-up or infeed side of the drawframe 9 there is provided a guide track 28 or equivalent structure for the cans which are to be transported into the drawframe 9. In analogous manner there is provided below the chain run 29 a guide track 30 or equivalent structure for the cans which are to be transported out or delivered from the drawframe 9. The can output or delivery station 12 is arranged in such a manner that the filled cans 2 are pushed away from the guide track, and specifically from the engaging gripper arms 23 of the can transporting device 10 by means of a horizontally arranged piston and cylinder unit 31 which incorporates a pusher or pusher element 31a which displaces the cans 2 into the can output station 12. The displacement piston and cylinder unit 31, like the drive motor 17 for indexing the turntable plate 14 and equally the piston and cylinder unit 20 for the pusher or pusher rod 21, are operated by a suitable control 40. A limit switch 32 which is located at the end of the can output station 12, after each third can 2 has been pushed by the pusher 31a onto the can output station 12, activates a e.g. pneumatic piston and cylinder unit 33 via the control 40, with the result that a group of three cans 2 is pushed by means of the pusher or thrust rod 34 of the piston and cylinder unit 33 onto a transporting trolley 15 which is located in a preparatory position for on-loading the filled cans 2.

Having now had the benefit of the foregoing discussion of the exemplary embodiment of system for handling cans or the like which are moved selectively back and forth by transporting trolley trains between a spinning preparatory machine for filling the cans and a spinning machine where the cans are emptied, there will now be discussed the operation and method of loading the transporting trolley 15 with full cans and transporting them to the spinning machine which is fed with the fiber sliver. A tractor 4 transports a transporting trolley train, such as the train 6, loaded with empty cans 2 which have been emptied at an open-end spinning machine 1, to the rotating device 13 which selectively indexes each of the trolleys 15 into position for off-loading the empty cans. After uncoupling the tractor 4 the first transporting trolley 15 of such transporting trolley train 6 is engaged by the pawl or catch 16 by manually moving such first transporting trolley 15 to the operable zone of the catch 16 of the rotating device 13 at location A. Now the control 40 activates the drive motor 17 of the turntable plate 14 in a manner such that this plate 14 is rotated or indexed through an angle of 60° and the first transporting trolley is brought to the unloading position B in front of the can take-up station 11. During this time the second transporting trolley 15 which is still hitched or connected with the first transporting trolley 15 via the center pole 8 or equivalent structure, also is engaged by the pawl or catch 16 of the rotating device 13 at location A. Later on, following off-loading of the empty cans from the first transporting trolley 15 the turntable 14 will again be rotated in a stepwise manner through 60° and in a sequence coordinated with the can filling rhythm or cycle which is taking place at the spinning preparatory machine 9. Upon completion of the first 60° rotation of the turntable plate 14 the control 40 activates the pusher or thrust rod 21 so that all of the empty cans 2 are collectively transferred from the first transporting trolley 15 at location or position B to the can take-up station 11. At this location the empty cans 2 are moved through the agency of the driven rolls 22 towards the can transporting device 10, at which location each can 2 is individually gripped by one of the gripper arms 23 and incrementally or in a stepped sequence brought to the operable zone of the spinning preparatory machine i.e., the drawframe 9. The time which elapses between the sequential incremental movement steps advantageously corresponds to the time needed for filling one of the cans 2 at the drawframe 9. Each can 2 remains in contact with the same gripper arm 23 from the moment that it is gripped or engaged at the outfeed end of the can take-up station 11 until it is released in front of the can output or delivery station 12. At the time that a can reaches the infeed portion of the can output station 12 and is in a position in front of the piston and cylinder unit 31 the control 40 activates the latter so that the pusher element 31a thereof moves each can individually out of the operable region or reach of the associated gripper arm 23 into the can output station 12. After each third advancing or feed step of the indexed sprocket chain 26, i.e., each time that three cans are located in the can output station 12, the limit switch 32 will be activated and via the control 40 such group of three cans are then moved by the pusher or thrust rod 34 onto the transporting trolley 15 which in the meantime has been moved forward by the rotating or indexing device 13 from the unloading position B into a loading position C. During further indexing of the turntable plate 14 and while the transporting trolley 15 which is at location or position C is being moved into position D the pawl or catch 16 is disengaged from the transporting trolley 15 by any conventional disengaging device suitable for this purpose and therefore not particularly shown. Obviously disengagement of the transporting trolleys also could be carried out manually.

Now as soon as the transporting trolley train which is being processed and carries a number of cans 2 corresponding to the number of spinning positions of the open-end spinning machine 1 has been completely loaded with all of the cans 2, then the transporting trolley train is transported by a tractor 4 to the open-end spinning machine 1 or the like.

With the inventive method and apparatus for implementing such method there is derived a connection between the spinning preparatory machines and the spinning machines which, without requiring complications in the construction of the building or other structure, facilitates automating the procedures carried out in a spinning mill.

While there are shown and described present preferred embodiments of the invention, it is to be distinctly understood that the invention is not limited thereto, but may be otherwise variously embodied and practiced within the scope of the following claims.

Accordingly, what is claimed is:

1. A method of loading transporting trolleys with full cans by means of a can loading device and transporting the full cans to a spinning machine fed with fiber slivers and transporting empty cans to the can loading device comprising the steps of:
   1. transporting empty cans which have been placed upon transporting trolleys interconnected to form a transporting trolley train from a spinning machine fed with fiber sliver to a can loading device;
   2. transporting the empty cans from at least one of the transporting trolleys to a can take-up station;
   3. engaging the empty cans at the can take-up station by means of a revolving can transporting device;
   4. transporting the empty cans by means of the revolving can transporting device to a spinning preparatory machine delivering fiber sliver;
   5. filling the empty cans with fiber sliver at the spinning preparatory machine;
   6. transporting the filled cans to a can output station;
   7. displacing the filled cans from the can output station onto a transporting trolley of the same transporting trolley train; and
   8. then bringing the transporting trolley train in a train configuration back to the spinning machine fed with fiber sliver.

2. A method of loading transporting trolleys with full cans by means of a can loader and transporting the full cans to a spinning machine fed with fiber slivers and transporting empty cans to the can loader, comprising the steps of:
   1. transporting empty cans which have been placed upon transporting trolleys interconnected to form a transporting trolley train from a spinning machine fed with fiber sliver to a can loader;
   2. successively transporting the empty cans from each of the transporting trolleys to a can take-up station;
   3. engaging the empty cans at the can take-up station by means of a moving can transporting device;
   4. transporting the empty cans by means of the moving can transporting device to a spinning preparatory machine delivering fiber sliver;
   5. filling the empty cans with fiber sliver at the spinning preparatory machine;
   6. transporting the filled cans to a can output station;
   7. displacing the filled cans from the can output station onto transporting trolleys of a transporting trolley train; and
   8. bringing such transporting trolley train back to the spinning machine fed with fiber sliver.

3. An apparatus for loading transporting trolleys with full cans at a first location and transporting them from the first location to a second location containing a spinning machine fed with fiber slivers and transporting empty cans from the spinning machine to the first location for refilling the cans with fiber sliver, said apparatus comprising:
- A. a spinning preparatory machine for producing fiber sliver arranged at the first location;
- B. a spinning machine fed with fiber sliver arranged at the second location;
- C. a can loading station arranged at said first location;

said can loading station comprising:
- a. shifting means for bringing can transporting trolleys interconnected into a train and provided with empty cans thereon into a desired position for transfer of the empty cans to a can take-up station;
- b. means defining a can take-up station located in a position for receiving empty cans transferred from a transporting trolley to said can take-up station;
- c. said shifting means including first pusher means for transferring empty cans to the can take-up station;
- d. a movable can transporting device for engaging empty cans at the can take-up station and for delivering the empty cans to the spinning preparatory machine for loading the empty cans with fiber sliver;
- e. means defining a can output station;
- f. said movable can transporting device delivering the cans filled with fiber sliver at the spinning preparatory machine to the can output station; and
- g. said can output station including means defining second pusher means for moving the full cans onto an empty transporting trolley of the same transporting trolley train.

4. The apparatus as defined in claim 3, wherein said shifting means comprises a rotatable body, means for rotating said body, said body being provided with sides, each of said sides having engaging means for engaging with one of the interconnected transporting trolleys for moving the same into operative relationship with respect to said can take-up station.

5. The apparatus as defined in claim 4, wherein said engaging means serves to hold the transporting trolleys at the rotatable body and for releasing the transporting trolleys after full cans have been received thereon.

6. The apparatus as defined in claim 3, wherein said can take-up station includes a can transfer device which transports the cans to the can transporting device.

7. The apparatus as defined in claim 6, wherein said can transfer device comprises a plurality of rolls.

8. An apparatus for loading transporting trolleys with full cans at a work station and transporting them to a location containing a spinning machine fed with fiber slivers and transporting empty cans from the spinning machine to the work station for refilling the cans with fiber sliver, said apparatus comprising:
- A. a spinning preparatory machine for producing fiber sliver arranged at the work station;
- B. a spinning machine fed with fiber sliver;
- C. a can loading station arranged at said work station;

said can loading station comprising:
- a. means for bringing can transporting trolleys into a desired position for transfer of empty cans to a can take-up station;
- b. means defining a can take-up station located in a position for receiving empty cans transferred from a transporting trolley to said can take-up station;
- c. said bringing means including first displacement means for transferring empty cans to the can take-up station;
- d. a movable can transporting device for engaging empty cans at the can take-up station and for delivering the empty cans to the spinning preparatory machine for loading the empty cans with fiber sliver;
- e. means defining a can output station;
- f. said movable can transporting device delivering the cans filled with fiber sliver at the spinning preparatory machine to the can output station; and
- g. said can output station including means defining second displacement means for moving the full cans onto an empty transporting trolley.

* * * * *